United States Patent

Togashi et al.

Patent Number: 4,748,445
Date of Patent: May 31, 1988

[54] MATRIX DISPLAY PANEL HAVING A DIODE RING STRUCTURE AS A RESISTIVE ELEMENT

[75] Inventors: Seigo Togashi; Kanetaka Sekiguchi; Hiroshi Tanabe; Katsumi Aota; Kazuaki Sorimachi; Etsuo Yamamoto, all of Tokorozawa, Japan

[73] Assignee: Citizen Watch Co., Ltd., Tokyo, Japan

[21] Appl. No.: 627,987

[22] Filed: Jul. 5, 1984

[30] Foreign Application Priority Data

Jul. 13, 1983 [JP] Japan .................. 58-127407
Mar. 26, 1984 [JP] Japan .................. 59-57979

[51] Int. Cl.$^4$ .................................................. G09G 3/20
[52] U.S. Cl. ................................... 340/784; 340/718; 340/719; 340/811
[58] Field of Search ............... 340/718, 719, 784, 811, 340/825.79, 825.82; 357/45, 51; 313/498; 307/252, 259, 312 R

[56] References Cited

U.S. PATENT DOCUMENTS

| | | | |
|---|---|---|---|
| 4,070,663 | 1/1978 | Kanatani et al. | 340/784 |
| 4,198,630 | 4/1980 | Serinken et al. | 340/719 X |
| 4,203,043 | 5/1980 | Katakura | 307/317 R X |
| 4,223,308 | 9/1980 | Baraff et al. | 340/719 |
| 4,251,136 | 2/1981 | Miner et al. | 340/784 X |
| 4,367,471 | 1/1983 | Lillessen | 340/782 X |
| 4,642,620 | 2/1987 | Togashi et al. | 340/719 |

Primary Examiner—Gerald L. Brigance
Assistant Examiner—Jeffery A. Brier
Attorney, Agent, or Firm—Birch, Stewart, Kolasch & Birch

[57] ABSTRACT

A matrix display panel comprising a plurality of liquid crystal display elements. Each liquid crystal display element is connected to a plurality of diode rings which are connected in series between a scanning electrode and a data electrode. Each diode ring comprises a pair of diodes of opposite polarity which are connected in parallel.

6 Claims, 8 Drawing Sheets

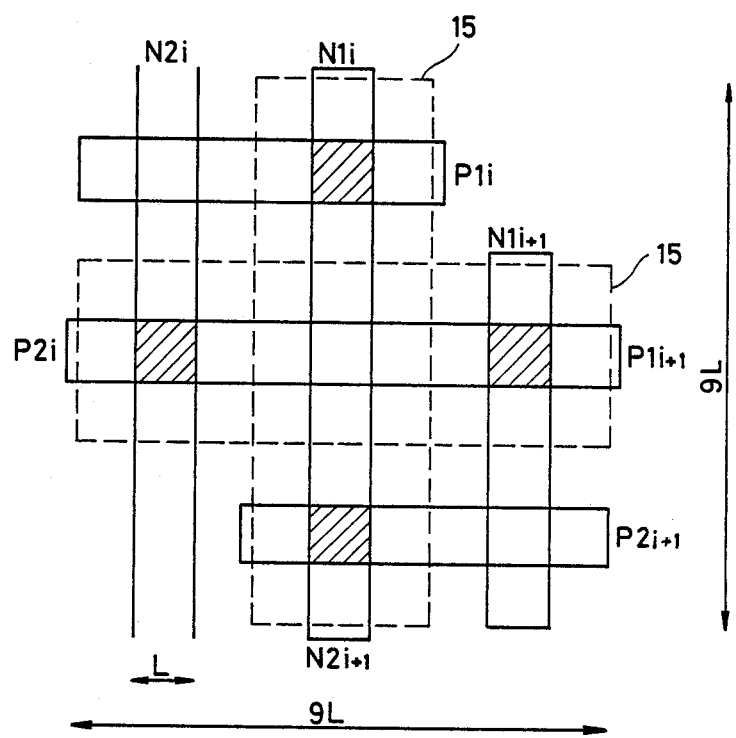
F I G. 11(a)
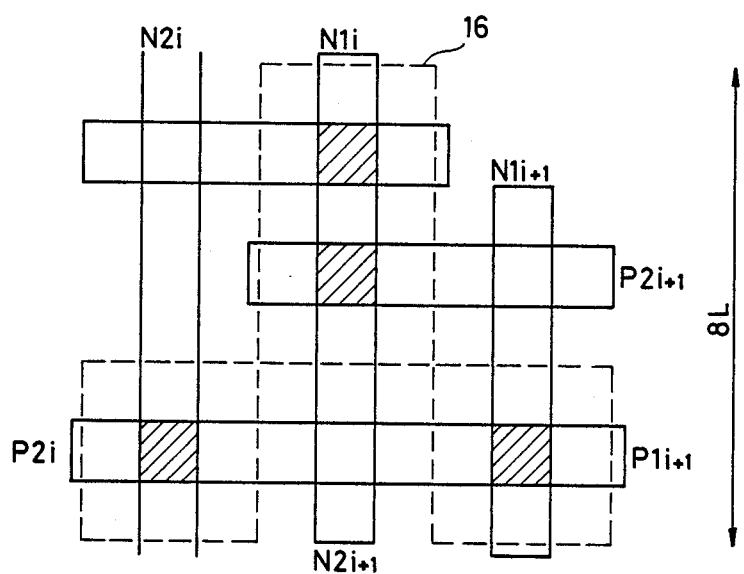
F I G. 11(b)

FIG. 12 (a) $\phi_j^*$
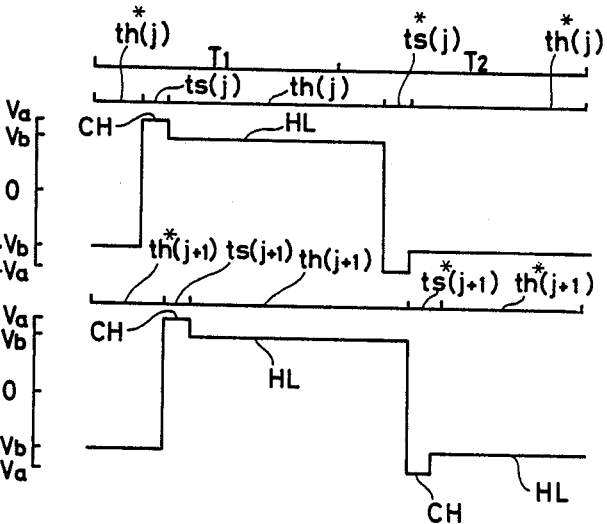
FIG. 12 (b) $\phi_{j+1}^*$
FIG. 12 (c) $\psi_i^*$
FIG. 12 (d) $\phi_{j+1}^* \psi_i^*$
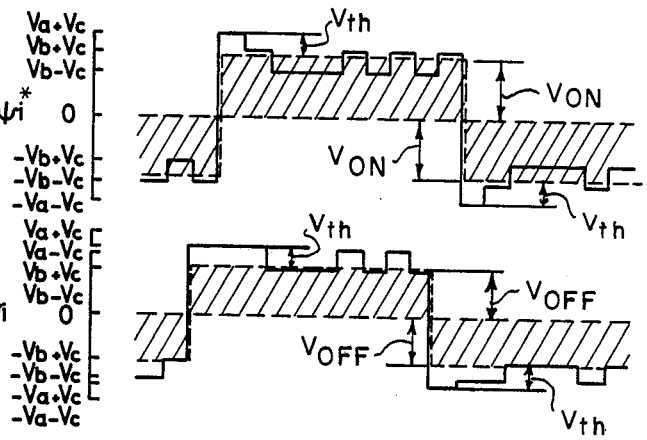
FIG. 12 (e) $\phi_j^* - \psi_i^*$

MATRIX DISPLAY PANEL HAVING A DIODE RING STRUCTURE AS A RESISTIVE ELEMENT

BACKGROUND OF THE INVENTION

The present invention relates to a display panel of a matrix type and more particularly to a display panel employed with nonlinear resistive elements each comprising diodes as switching elements for controlling a display device such as a liquid crystal display device.

Recently, an active matrix type display device in which a switching element is connected to each display element in a display device has been developed. For example, a published article entitled "Proc. IEEE" by B. J. Lechner et al., vol. 59 (1971), page 1566–1579 teaches such a display device. In the display device, a switching element, a three-terminal element such as a thin film transistor (TFT), or a two-terminal element such as a nonlinear resistive element (NLR) is employed. In particular, a display panel comprising nonlinear resistive elements combined with liquid crystal display devices is hopeful as a display device capable of having a high density of display elements.

SUMMARY OF THE INVENTION

An object of the present invention is to provide a matrix display panel in which a nonlinear resistive element for each display element can be disposed in a small area so as to increase the area of each picture element. The display element is, for example, employed with a liquid crystal display element. As the system for the liquid crystal display, various systems, such as a twisted nematic (TN) mode, guest host (GH) mode, and others, are used. Further, driving voltages, such as "on" voltage $V_{ON}$ and "off" voltage $V_{OFF}$, are different for each system. However, when a liquid crystal display device, each display element having a large difference between "on" voltage $V_{ON}$ and "off" voltage $V_{OFF}$, is controlled by nonlinear resistive elements, uniform voltages are not applied to the nonlinear resistive elements, thereby causing deterioration of the display effect.

Another object of the present invention is to provide a display panel which may reduce the above described disadvantages in the use of nonlinear resistive elements.

According to the present invention, there is provided a matrix display panel comprising a plurality of picture elements, each of said picture elements comprising a display element and a nonlinear resistive element which are connected in series, said nonlinear resistive element comprising at least one ring circuit including a pair of elements connected in parallel.

These and other objects and features of the present invention will become more apparent from the following description with reference to the accompanying drawings.

BRIEF DESCRIPTION OF THE DRAWINGS

FIG. 11(a) is a plan view of the embodiment shown in FIG. 8;

FIG. 11(b) is a plan view of the embodiment shown in FIG. 9;

FIGS. 12(a) to 12(e) show waveforms of driving signals for a liquid crystal display element;

DESCRIPTION OF THE PREFERRED EMBODIMENTS

Figure 1:
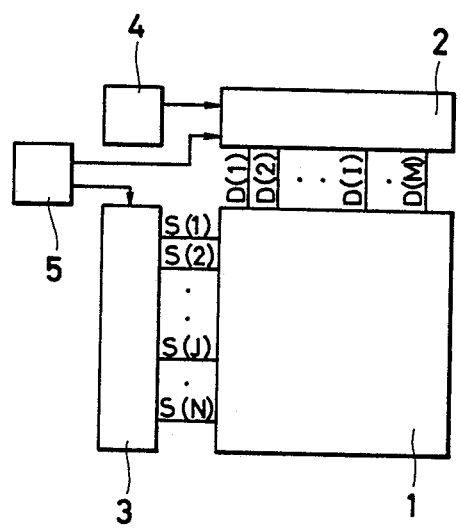
FIG. 1 is a block diagram showing a matrix liquid crystal display device employed with nonlinear resistive elements.

Referring to FIG. 1 showing an active matrix type display device, the display device comprises a display panel 1 addressed by a plurality of data electrodes D1, D2 . . . DI . . . DM and a plurality of scanning electrodes S1, S2 . . . SJ . . . SN. A data electrode driver 2 is provided for applying a data signal to the data electrodes in accordance with information from a video processing circuit 4. A scanning electrode driver 3 is provided for applying a scanning signal which is sequentially applied to a selected scanning electrode. A clock pulse circuit 5 is provided for applying various timing signals to each driver.

Figure 2:
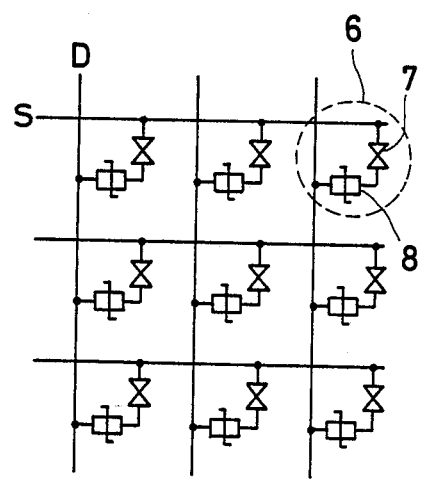
FIG. 2 is an equivalent circuit showing a part of a display panel.

Referring to FIG. 2 showing an equivalent circuit of a matrix display panel, the panel comprises a plurality of picture elements 6 each of which comprises a liquid crystal display element 7 and nonlinear resistive element 8.

Figure 3:
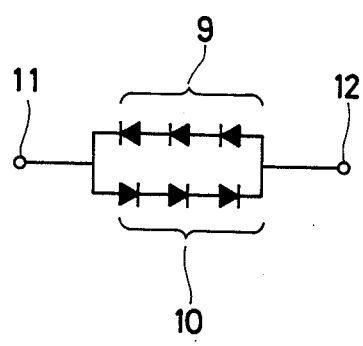
FIG. 3 shows a conventional nonlinear resistive element comprising a plurality of diodes.

FIG. 3 shows a known nonlinear resistive element composed by a pair of diode-strings 9 and 10 of diodes. Forward direction threshold voltage $V_{th}$ of a diode is usually about 0.3–1.0 V. However, higher threshold voltage is desired for a display panel. To this end, a plurality of diodes are connected in series. Further a pair of diode-strings 9 and 10 are connected in reverse directions each other between two contacts 11 and 12 for providing a bidirectional element.

However, if a diode is short circuited by leakage, the bidirectional characteristic is lost so that a bias direct current is added to the driving voltages for the display element, which results in the deterioration of reliability and in the life time of the panel.

A purpose of present invention is to eliminate these disadvantages of nonlinear resistive elements.

Figure 4:
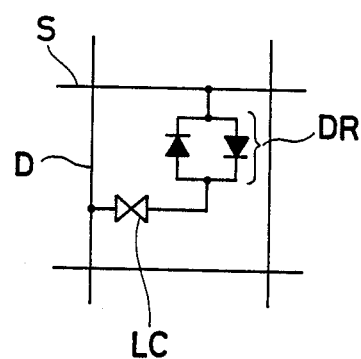
FIG. 4 is a circiut of a unit of a display element according to the present invention.

FIG. 4 shows a picture element according to the present invention. The picture element comprises scanning electrodes S, data electrodes D, a liquid crystal display element LC, and a nonlinear resistive element DR comprising a diode ring. The diode ring has a lower threshold voltage $V_{th}$ and an excellent stability of threshold characteristics.

Figure 5:
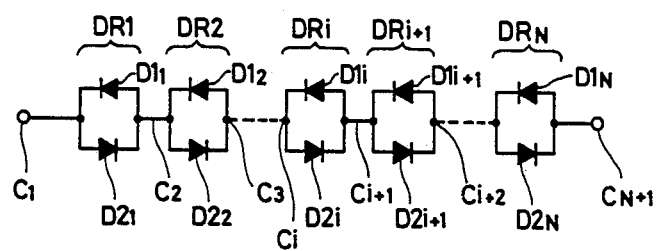
FIG. 5 is an equivalent circuit of a nonlinear resistive element comprising a plurality of diode rings according to the present invention.

FIG. 5 shows an example of a nonlinear resistive element according to the present invention. The element comprises a plurality of diode rings. Each diode ring comprises diodes D1i and D2i each having opposite polarity and connected to each other in parallel at two contacts Ci and Ci+1. A plurality of these diode rings DRi are connected in series to form a nonlinear resistive element. The nonlinear resistive element can be made smaller in area and higher in productivity than the conventional nonlinear resistive element of FIG. 3, as described hereinafter.

Figure 6A:
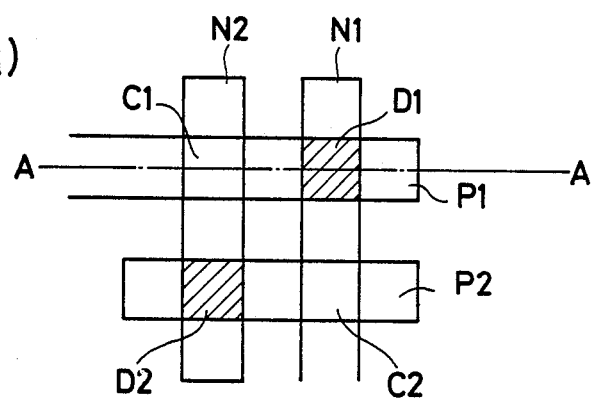
FIG. 6(a) is a plan view of a diode ring of one-stage according to the present invention.
Figure 6B:
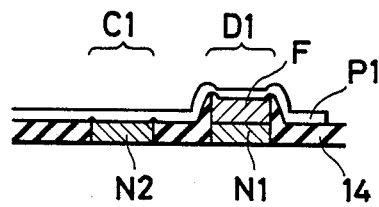
FIG. 6(b) is a sectional view taken along the line A—A of FIG. 6(a)
Figure 6C:
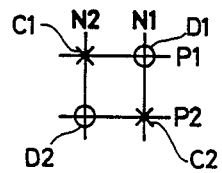
FIG. 6(c) is a schematic diagram of FIG. 6(a)

Assembly of a diode ring comprising an amorphous silicon thin film diode will be hereinafter described. Referring to FIGS. 6(a) and 6(b), a pair of parallel reverse electrodes N1, N2 in the form of a strip are formed in grooves provided in an insulation layer 14. Then, an amorphous silicon thin film F is formed by a self alignment method so as to be positioned on intersections D1, D2 of the reverse electrodes N1, N2 and forward electrodes P1, P2 which will be formed on the strip thereafter. Amorphous silicon thin film formed on the other intersections C1, C2 is previously removed. Thus, thin film diodes D1, D2 and junctures C1, C2 of electrodes N1, N2 and P1, P2 are formed. In FIG. 6(c), a mark (o) represents a diode and mark (x) represents a juncture.

Figure 7A:
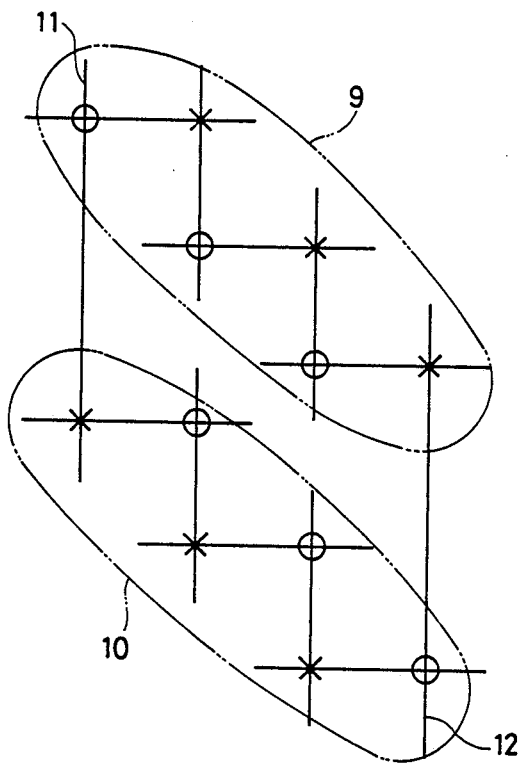
FIG. 7(a) is a schematic diagram showing the conventional nonlinear resistive element of FIG. 3.

FIG. 7(a) shows the conventional nonlinear resistive element of FIG. 3 which is made in the same way as FIG. 6.

Figure 7B:
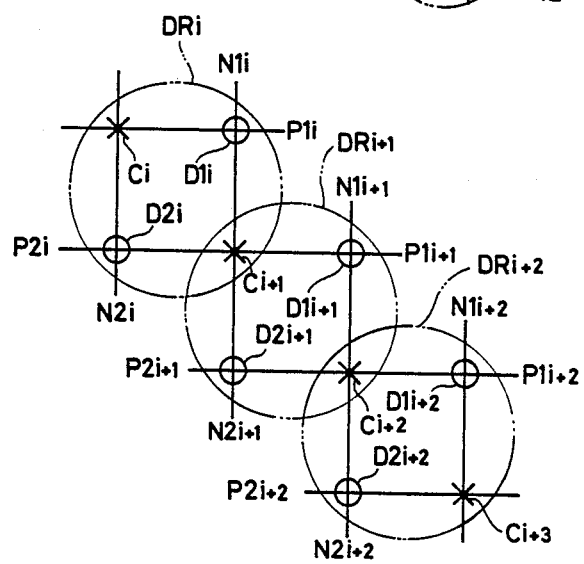
FIG. 7(b) is a schematic diagram showing a nonlinear resistive element of three-stage connection according to the present invention.

FIG. 7(b) shows a schematic diagram of a nonlinear resistive element of the present invention, in which the element comprises six diodes and four contacts to form three-stage diode rings.

In comparing the nonlinear resistive element of FIG. 7(b) with FIG. 7(a), it should be noted that the number of diodes in FIG. 7(b) is equal to FIG. 7(a), the number of the juncture of FIG. 7(b) is four and that of FIG. 7(a) is six. Generally, in the conventional element, junctures of 2N are necessary for an N-stage diode connection. To the contrary, in the present invention, the number of the juncture is N+1. As is understood from FIG. 6(a), the area of a diode is approximately equal to that of a juncture. Accordingly, in accordance with the present invention, area for the junctures can be greatly reduced compared with the total area of display elements. In a liquid crystal display panel, the display area, that is, the opening ratio has an influence on the brightness of the display. Thus, in accordance with the present invention, a display device having a high opening ratio, which means a high brightness, can be produced.

The present invention will be explained in more detail with reference to FIG. 7(b) hereinafter.

A diode ring DRi of an ith term comprises a first diode D1i formed on an intersection of a first forward electrode P1i and a first reverse electrode N1i, a second diode D2i formed on an intersection of a second forward electrode P2i and a second reverse electrode N2i, a first juncture Ci of the first forward electrode P1i and the second reverse electrode N2i, and a second juncture Ci+1 of the first reverse electrode N1i and the second forward electrode P2i. Similarly, a diode ring DRi+1 of (i+1)th term comprises a first diode D1i+1 formed on an intersection of a first forward electrode P1i+1 and a reverse electrode N1i+1, a second diode D2i+1 formed on an intersection of a second forward electrode P2i+1 and a second reverse electrode N2i+1, a first juncture Ci+1 of the first forward electrode P1i+1 and the second reverse electrode N1i+1, which is common with the second juncture of the diode ring DRi, and a second juncture Ci+2 of the first reverse electrode N1i+1 and the second forward electrode P2i+1. In this embodiment, i represents one of natural numbers from 1 to N−1 and N represents the whole stage numbers of diode ring.

In accordance with the pattern of FIGS. 6(a) and 7(b), every intersections can be made equal in area, since electrodes cross at the right angle at every intersection.

Figure 8:
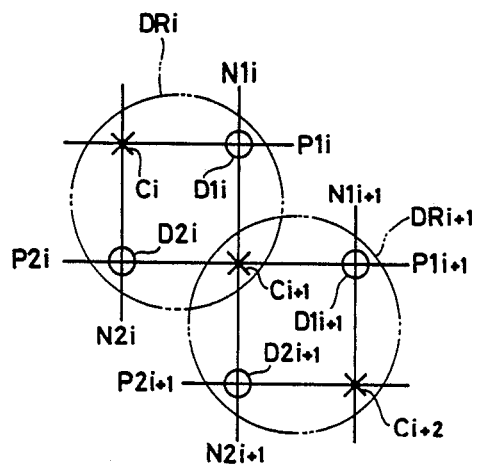
FIGS. 8 to 10 are simplified patterns of further embodiments of the present invention.

FIG. 8 shows a part of the embodiment of FIG. 7 for a convenient comparison with further embodiments.

Figure 9:
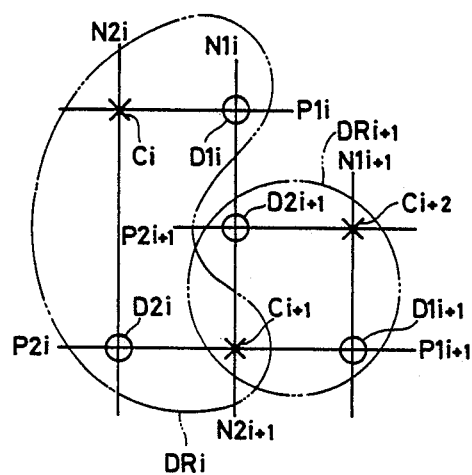

FIG. 9 shows another embodiment, in which forward electrodes P2i and P1i+1 of FIG. 8 are exchanged with the forward electrode P2i+1. Thus, the first diode D1i of the diode ring DRi is adjacent to the second diode D2i+1 of the diode ring DRi+1 in the pattern.

FIGS. 11(a) and 11(b) show plan views of the embodiments of FIGS. 7 and 8. Assuming that a minimum width of the electrode is L, a necessary space between electrodes will be 2L in order to obtain an accurate element. Accordingly, the area of the element of FIG. 11(a) is approximately 9L×9L and that of FIG. 11(b) is 9L×8L which is smaller than FIG. 11(a). This is caused by the adjacent disposition of diodes. In manufacturing of an element by the self alignment method, it is necessary to provide a pattern in order to distinguish the position for the diode from the position for the juncture. Reference numerals 15 and 16 designate such patterns. In the element of FIG. 11(a), a 3L length is necessary for one electrode. To the contrary, in FIG. 11(b), a 5L length is provided for two electrodes. That is to say, the width of the pattern is reduced by 1L for one adjacent disposition of two diodes.

Figure 10:
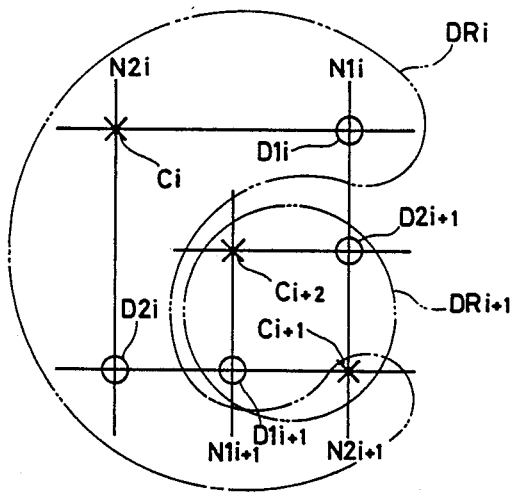

FIG. 10 shows another embodiment of FIG. 9, in which reverse electrode N1i and N1i+1 of FIG. 9 are exchanged with the reverse electrode N1i+1. Thus, the second diode D2i of the diode ring DRi is adjacent to the first diode D1i+1 of the diode ring DRi+1 in the pattern. Although the above described exchanges of electrodes are carried out in two-stage elements, such exchanges can be done in three or more stage element.

FIGS. 12(a)–12(e) show waveforms preferable for driving the display device employed with a nonlinear element having a low threshold voltage. In the figures, $\phi^*$ shows waveforms for scanning electrode S, and $\Psi^*$ is a waveform for the data electrode D. The waveform $\phi^*$ consists of a charging phase CH during the period ts(j) and a holding phase HL during the period th(j). Voltage of hatched portions correspond to "on" voltage $V_{ON}$ and "off" voltage $V_{OFF}$ which are applied to the display device. The relationship between those voltages and the threshold voltage $V_{th}$ may be expressed by the following formula;

$$V_{ON} - V_{OFF} \leq V_{th}$$

An amorphouse silicon diode has a threshold voltage of about 0.5–0.6 V. An ordinary twisted nematic-mode liquid crystal display is operated by such a voltage differential so that 90 percent of the optical characteristics of the display device will be affected. However, a liquid crystal display having a much larger operational temperature range must be driven at a high voltage, so that a threshold voltage higher than the above described voltage is necessary. Further, optical characteristics in guest-host-mode do not change as rapidly as in twisted nematic-mode. Accordingly, a threshold voltage higher than 1 volt is necessary.

Figure 13:
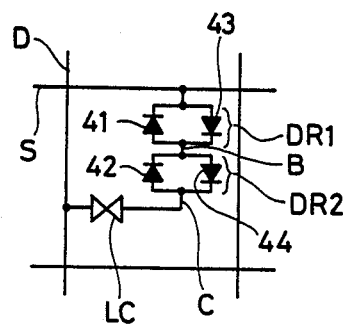
FIG. 13 is a circiut of another example of a picture element unit according to the present invention.

FIG. 13 shows a picture element unit for realizing threshold voltages of 1 volt or more. The picture element unit comprises a diode ring DR1 having diodes 41 and 43 and a diode ring DR2 having diodes 42 and 44 connected in series to form a two-stage nonlinear element. Other components are the same as FIG. 4.

Figure 15A:
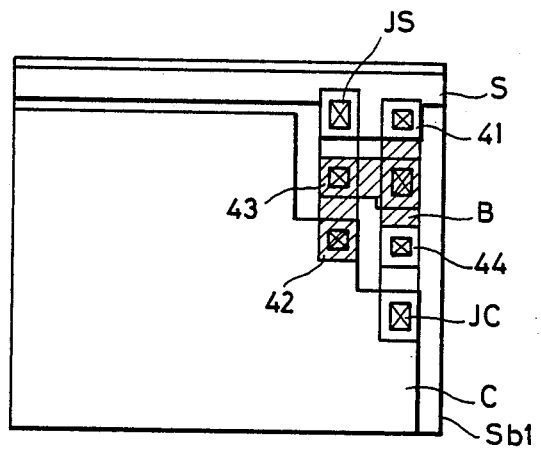
FIGS. 15(a) and 15(b) show plan views of first and second substrates of a conventional picture element unit.
Figure 15B:
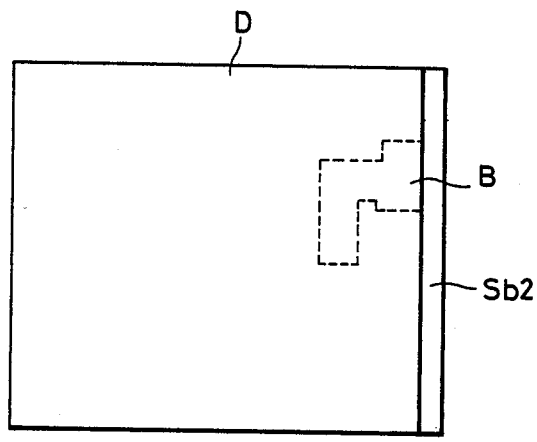

FIG. 15(a) shows a pattern on a first substrate and FIG. 15(b) is a pattern on a second substrate of the unit of FIG. 13. On the first substrate of FIG. 15(a), diodes 41, 42, 43 and 44, a juncture B between the diode rings DR1 and DR2, display electrode C, scanning electrode S, and junctures JS and JC for scanning electrode S and display electrode C are formed. On the second substrate of FIG. 15(b), the data electrode D is formed. A liquid crystal is disposed between both substrates.

Figure 14:
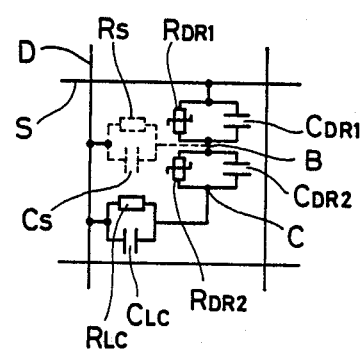
FIG. 14 is an equivalent circuit of the embodiment as shown in FIG. 13.

FIG. 14 shows an equivalent circuit of the picture element of FIG. 13. Diode rings DR1 and DR2 are represented by capacitances $C_{DR1}$ and $C_{DR2}$ and nonlinear resistances $R_{DR1}$ and $R_{DR2}$, respectively. The liquid crystal element LC is represented by capacitance $C_{LC}$ of liquid crystal material and leakage resistance $R_{LC}$ which are connected in parallel. The question is stray capacitance $C_s$ and stray resistance $R_s$ shown by dashed lines. The stray capacitance $C_s$ affects the distribution of electric charge during the transition from the charging phase CH to the holding phase HL shown in FIG. 12, causing the fluctuation of the amount of electric charge to be stored in the liquid crystal capacitor (capacitance $C_{LC}$). The stray resistance Rs aggravates the malfunction. The juncture B between the diode rings is held at an intermediate voltage between the scanning electrode S and the display electrode C, unless disturbed by the stray resistance RS, should this stray resistance exist. On the other hand, the data electrode D is applied with a complicated data signal $\Psi^*i$ shown in FIG. 12(c). Accordingly, the voltage at the juncture B is decided by a complicated relation between voltages on both electrodes. If leakage charge is irregularly applied to the juncture B through the stray resistance Rs in dependence on the complicated voltage relationship, the voltage at the juncture B is held to an intermediate value between the voltages on both electrodes, and hence voltages applied to nonlinear elements DR1 and DR2 are different from each other. In addition, since the applied electric charge is dependent on a data signal, it is not constant. Accordingly, the nonlinear elements DR1 and DR2 do not operate as a stable nonlinear element. Such electrical connection by resistor, capacitor and the like between the juncture and electrode has a very deleterious influence on the display effect.

According to another aspect of the present invention, the above described disadvantages can be eliminated.

Figure 16A:
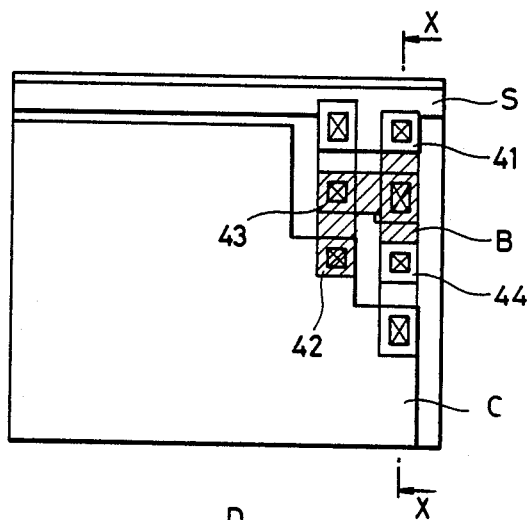
FIGS. 16(a) and 16(b) show first and second substrates in another embodiment of the present invention.
Figure 16B:
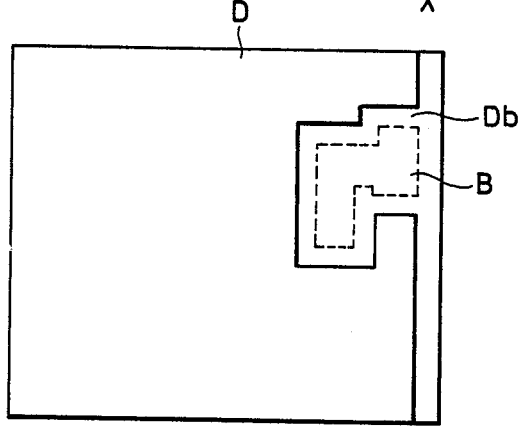
Figure 16C:
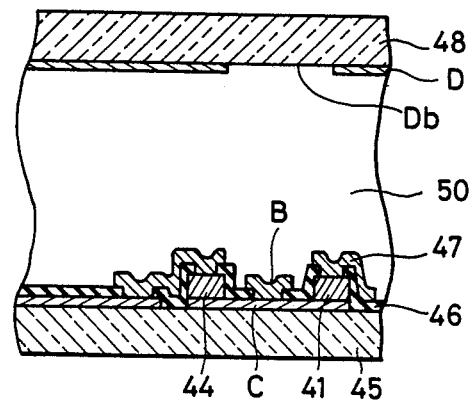
FIG. 16(c) is a sectional view taken along the line X—X in FIG. 16(a).

FIGS. 16(a) to 16(c) show another embodiment of the present invention. The structure of a first substrate of FIG. 16(a) is the same as FIG. 15(a) in construction. In FIG. 16(c), reference numeral 45 designates the first substrate on which a display electrode C, insulation layer 46, diodes 41 and 44, and metalic film 47, corresponding to the forward or reverse electrode, are formed. On the second substrate 48, a data electrode D is formed. Between both electrodes C and D, a liquid crystal material 50 is provided. The data electrode D has a blank portion Db corresponding to the juncture B (hatched range in FIG. 16(a)) of the first substrate in order to avoid an electrical connection there-between. In other words, the electrode D has a shape in plan view which does not correspond to the juncture B. Since the first and second substrates are arranged with the liquid crystal material interposed therebetween, the degree of capacitive conductivity between the data electrode D and juncture B is greatly reduced, for example, 1/10 or more compared with the element of FIG. 15. Such a low conductivity has no influence on the dispay effect in practice.

It will be understood that the scanning electrode S of FIG. 16(a) and the data electrode D of FIG. 16(b) are exchangeable with each other. In this case, the structure of scanning electrode S is formed so as to avoid an electric connection with the jucture B.

Although the present invention is described with respect to embodiments employed with a liquid crystal display device, another display device can be employed. When an electrochromic display device is employed in place of a liquid crystal display panel, after the pattern of FIG. 16(a) is formed, an electrochromic layer is disposed on the substrate, on which a data electrode D is formed. Further, other nonlinear elements such as a metal-insulator-metal (MIM) element can be used instead of the diode ring.

The connecting method in the embodiment of FIGS. 16(a) to 16(c) can be used in a display element employed with a nonlinear element such as FIG. 3.

From the foregoing it will be understood that the present invention provides a panel display employed with a nonlinear element made by connecting a plurality of elements in series so as to have a low $V_{th}$ without defects. It is possible to employ a TN-mode liquid crystal having higher driving voltage, a GH-mode liquid crystal having high contrast, or an electrochromic display in the display panel of the present invention.

While the invention has been described in conjunction with preferred specific embodiments thereof, it will be understood that this description is intended to illustrate and not limit the scope of the invention, which is defined by the following claims.

What is claimed is:

1. A matrix display panel having a lattice formed by a plurality of column electrodes and a plurality of row electrodes, and a picture element connected to a said column electrode and to a said row electrode at each division of the lattice, each said picture element comprising:

a display element and a non-linear resistive element connected in series, said non-linear resistive element including a plurality of diode rings connected in series, each said diode ring including a pair of diodes of opposite polarity connected in parallel, each said diode ring being connected to an adjacent diode ring by a single juncture, wherein said plurality of diode rings is formed by a plurality of forward electrodes and a plurality of reverse electrodes, each said forward and reverse electrode being in the form of a strip, the strips of said forward electrodes intersecting the strips of said reverse electrodes, a pair of said diodes of each diode ring being formed at first intersections of a pair of said forward electrode strips with a pair of said reverse electrode strips, each said juncture of the diode ring being formed at a second intersection of said pairs of forward and reverse electrode strips other than said first intersection.

2. A matrix display panel according to claim 1 wherein each said display element is a liquid crystal display element.

3. A matrix display panel according to claim 1 wherein said row and column electrodes comprise scanning electrodes and data electrodes, respectively.

4. A matrix display panel according to claim 3 wherein one of said scanning and data electrodes is formed so as to avoid an electrical connection with that said juncture.

5. A matrix display panel according to claim 3 wherein any one of said diode rings comprises:
 a first diode formed in an intersection of a first forward electrode strip and a first reverse electrode strip,
 a second diode formed in an intersection of a second forward electrode strip and a second reverse electrode strip,
 a first juncture formed in an intersection of the first forward electrode strip and the second reverse electrode strip, and
 a second juncture formed in an intersection of the first reverse electrode strip and the second forward electrode strip; and
 a diode ring adjacent to said one diode ring comprises,
 a first diode formed in an intersection of said second forward electrode strip and a third reverse electrode strip,
 a second diode formed in an intersection of a third forward electrode strip and said first reverse electrode strip,
 a first juncture formed in an intersection of the second forward electrode strip and the first reverse electrode strip, and
 a second juncture formed in an intersection of the third reverse electrode strip and the third forward electrode strip,
 the second juncture of said adjacent diode ring being common to the first juncture of said one diode ring.

6. A matrix display panel according to claim 2 wherein said row and column electrodes comprise scanning electrodes and data electrodes, respectively.

* * * * *